Patented June 3, 1924.

1,496,526

UNITED STATES PATENT OFFICE.

HAROLD N. COX, OF GLEN RIDGE, NEW JERSEY, ASSIGNOR TO NEW JERSEY PATENT COMPANY, OF WEST ORANGE, NEW JERSEY, A CORPORATION OF NEW JERSEY.

PRODUCTION OF ELECTRODES FOR GALVANIC BATTERIES.

No Drawing. Original application filed April 12, 1919, Serial No. 289,644. Divided and this application filed December 14, 1920. Serial No. 430,782.

*To all whom it may concern:*

Be it known that I, HAROLD N. COX, a citizen of the United States, and a resident of Glen Ridge, Essex County, New Jersey, have invented certain new and useful Improvements in the Production of Electrodes for Galvanic Batteries, of which the following is a description.

The present application is a division of my co-pending application, Serial No. 289,644, filed April 12, 1919, and entitled, Production of electrodes for galvanic batteries on which Patent No. 1,366,559 was granted on Jan. 25, 1921.

My invention relates to the production of electrodes for galvanic batteries, and more particularly those employing a caustic alkaline electrolyte, and in which the negative electrode consists of an element or elements of oxid of copper or other depolarizing agent and the positive electrode consists of an element or elements of zinc.

In batteries of this type, the negative electrodes are usually made in the form of plates or cylinders molded from a mass of finely divided oxid of copper. As oxid of copper is a material the particles of which have very slight attraction for each other, it has heretofore been necessary in forming such electrodes to subject the finely divided copper oxid to an enormous pressure in molding and to then bake or heat the molded element for a considerable period under a red heat in order to properly agglomerate and harden the same. It has also been customary before molding the finely divided oxid of copper, to mix a slight amount of alkaline water therewith.

The principal object of my invention is to produce an improved electrode of this character which will be more uniform in structure and which will be self-sustaining and sufficiently hard and strong for practical use, without subjecting the same to the usual baking operation.

My invention also resides in the method of making my improved electrode.

I have found that molded oxid of copper electrodes in which an electrolyte, such, for example, as sodium hydroxid, or a mixture of the same, either with finely divided zinc or any other metal which will reduce copper oxid in the presence of an electrolyte or which, in other ords, is more electro-positive than copper, if properly incorporated or combined with the oxid of copper as a binder therefor, are sufficiently hard, strong and coherent without baking. Moreover, the disposition of the oxid of copper in such an electrode is more uniform than in electrodes of this character heretofore employed, and consequently the electrode is more uniform in its action in the cell.

Where zinc, or other suitable metal, is mixed or associated with sodium hydroxid or other suitable electrolyte as a binder for the oxid of copper, the electrode produced is harder and stronger than where the binder consists only of sodium hydroxid or other suitable electrolyte; and when zinc is employed in the binder it is unnecessary to provide the electrode with a layer of copper or other conducting material in order to start the action of the cell.

Electrodes embodying my invention may be made by various methods, but I find the following to be the preferred:

In case a binder consisting of zinc combined with sodium hydroxid is employed, substantially 100 parts by weight of cupric oxid is first mixed with substantially 2 parts by weight of finely divided zinc and with a sufficient amount of a 20% solution of sodium hydroxid to make the final sodium hydroxid content of the electrode when dry about 2% of its weight. The cupric oxid is preferably of such fineness that it will all pass through a 100 mesh screen and 75% of it will pass through a 200 mesh screen. The mixture thus produced is compressed into an electrode element of the desired form in a suitable mold, and such element is then removed from the mold and thoroughly dried, after which it is ready to be set up in a cell.

It is to be understood that the forms of electrodes specifically described herein, as well as the method for producing the same, are merely illustrative of my invention, and that many modifications and changes may be made therein without departing from the spirit of the invention and the scope of the appended claims.

Having now described my invention, what I claim as new and desire to protect by Letters Patent is as follows:

1. A self-sustaining electrode element for galvanic batteries, consisting of oxid of copper and a mixture of finely divided metallic material which is more electro-positive than copper and sodium hydroxid as a binder, substantially as described.

2. An electrode for galvanic batteries, consisting of oxid of copper and a mixture of finely divided zinc and sodium hydroxid as a binder, substantially as described.

3. A self-sustaining electrode element for galvanic batteries, consisting of a mixture of approximately 100 parts by weight of oxid of copper, 2 parts by weight of finely divided metallic material, which is more electro-positive than copper, and 2 parts by weight of sodium hydroxid, substantially as described.

4. An electrode for galvanic batteries, consisting of a mixture of approximately 100 parts by weight of oxid of copper, 2 parts by weight of finely divided zinc, and 2 parts by weight of sodium hydroxid, substantially as described.

5. The method of forming an electrode for galvanic batteries, which consists in incorporating oxid of copper, finely divided metallic material which is more electro-positive than copper, and a solution of sodium hydroxide in a molded element, and then drying such element, substantially as described.

This specification signed this 11th day of December, 1920.

HAROLD N. COX.